United States Patent
Mizuno et al.

(10) Patent No.: US 11,549,237 B2
(45) Date of Patent: Jan. 10, 2023

(54) WORK VEHICLE AND CONTROL SYSTEM FOR WORK VEHICLE

(71) Applicant: KOMATSU LTD., Tokyo (JP)

(72) Inventors: Hiroyuki Mizuno, Tokyo (JP); Satoru Ide, Tokyo (JP)

(73) Assignee: KOMATSU LTD., Tokyo (JP)

( * ) Notice: Subject to any disclaimer, the term of this patent is extended or adjusted under 35 U.S.C. 154(b) by 148 days.

(21) Appl. No.: 16/329,297

(22) PCT Filed: Dec. 28, 2016

(86) PCT No.: PCT/JP2016/089059
§ 371 (c)(1),
(2) Date: Feb. 28, 2019

(87) PCT Pub. No.: WO2018/123001
PCT Pub. Date: Jul. 5, 2018

(65) Prior Publication Data
US 2019/0249397 A1 Aug. 15, 2019

(51) Int. Cl.
| | |
|---|---|
| E02F 9/26 | (2006.01) |
| H04N 5/247 | (2006.01) |
| H04N 5/265 | (2006.01) |
| B60R 1/00 | (2022.01) |
| E02F 9/24 | (2006.01) |
| H04N 7/18 | (2006.01) |

(52) U.S. Cl.
CPC .............. *E02F 9/26* (2013.01); *B60R 1/00* (2013.01); *E02F 9/24* (2013.01); *H04N 5/247* (2013.01); *H04N 5/265* (2013.01); *H04N 7/18* (2013.01); *B60R 2300/105* (2013.01); *B60R 2300/607* (2013.01); *B60Y 2200/412* (2013.01)

(58) Field of Classification Search
CPC ...... E02F 9/26; E02F 9/24; B60R 1/00; B60R 2300/105; B60R 2300/607; H04N 5/247; H04N 5/265; H04N 7/18; B60Y 2200/412
See application file for complete search history.

(56) References Cited

U.S. PATENT DOCUMENTS

| | | |
|---|---|---|
| 2007/0168101 A1 | 7/2007 | Shibamori et al. |
| 2009/0009308 A1 | 1/2009 | Date et al. |
| 2010/0277590 A1 | 11/2010 | Ariga et al. |

(Continued)

FOREIGN PATENT DOCUMENTS

| | | |
|---|---|---|
| CN | 1942634 A | 4/2007 |
| CN | 101243230 A | 8/2008 |

(Continued)

OTHER PUBLICATIONS

Machine translation of WO2015125979A1.*

*Primary Examiner* — Tyler J Lee
*Assistant Examiner* — Yufeng Zhang
(74) *Attorney, Agent, or Firm* — Faegre Drinker Biddle & Reath LLP

(57) ABSTRACT

A monitor controller configured to control a display content on a display unit is configured to keep displaying a bird's-eye-view image when an operation of an operation device is sensed in the state where the display unit displays the bird's-eye-view image, and to cause the display unit to display the bird's-eye-view image when the operation of the operation device is sensed in the state where the display unit does not display the bird's-eye-view image.

4 Claims, 7 Drawing Sheets

(56) References Cited

U.S. PATENT DOCUMENTS

| | | |
|---|---|---|
| 2013/0182066 A1 | 7/2013 | Ishimoto |
| 2016/0023602 A1* | 1/2016 | Krishnan .............. G09G 5/003 348/115 |
| 2017/0305018 A1 | 10/2017 | Machida et al. |
| 2018/0088661 A1* | 3/2018 | Betancourt ...... G08G 1/096725 |

FOREIGN PATENT DOCUMENTS

| | | |
|---|---|---|
| CN | 101883899 A | 11/2010 |
| CN | 103141090 A | 6/2013 |
| JP | 2001-295321 A | 10/2001 |
| JP | 2007-278025 A | 10/2007 |
| JP | 2012-74929 A | 4/2012 |
| JP | WO 2016/174953 A1 | 11/2016 |
| WO | WO-2015/125979 A1 | 8/2015 |

\* cited by examiner

WORK VEHICLE AND CONTROL SYSTEM FOR WORK VEHICLE

TECHNICAL FIELD

The present invention relates to a work vehicle and a control system for the work vehicle.

BACKGROUND ART

Conventionally, there has been a proposed technique for a hydraulic excavator including: a revolving unit equipped at its rear portion with two cameras; and a controller for selecting one of images from two cameras and causing the selected image to be displayed on a monitor unit, for causing the monitor unit to automatically display an image on the upstream side in the rotation direction during rotation of the revolving unit (for example, see Japanese Patent Laying-Open No. 2001-295321 (PTL 1)).

Also conventionally, there has been a proposed technique for a hydraulic excavator including a revolving unit equipped with a plurality of cameras, for displaying images taken by the plurality of cameras on one screen of a monitor screen. Specifically, during the operation of a control lever, a camera image of a view seen in the direction opposite to the operation direction of the control lever is displayed in an enlarged manner (for example, see Japanese Patent Laying-Open No. 2007-278025 (PTL 2)).

CITATION LIST

Patent Literature

PTL 1: Japanese Patent Laying-Open No. 2001-295321
PTL 2: Japanese Patent Laying-Open No. 2007-278025

SUMMARY OF INVENTION

Technical Problem

When a work vehicle is actuated, it is desirable to actuate the work vehicle after an operator checks the surrounding conditions.

An object of the present invention is to provide a work vehicle, for which the surrounding conditions can be checked at its actuation.

Solution to Problem

A work vehicle according to the present invention includes: an operation device configured to be operated for actuating the work vehicle; a generation unit configured to generate a bird's-eye-view image around the work vehicle; a display unit on which the bird's-eye-view image can be displayed; and a controller configured to control a display content on the display unit. The controller is configured to keep displaying the bird's-eye-view image when an operation of the operation device is sensed in a state where the display unit displays the bird's-eye-view image, and to cause the display unit to display the bird's-eye-view image when the operation of the operation device is sensed in a state where the display unit does not display the bird's-eye-view image.

Advantageous Effects Of Invention

According to the present invention, a surrounding image can be displayed on a monitor when the work vehicle is actuated.

DESCRIPTION OF EMBODIMENTS

Figure 1:
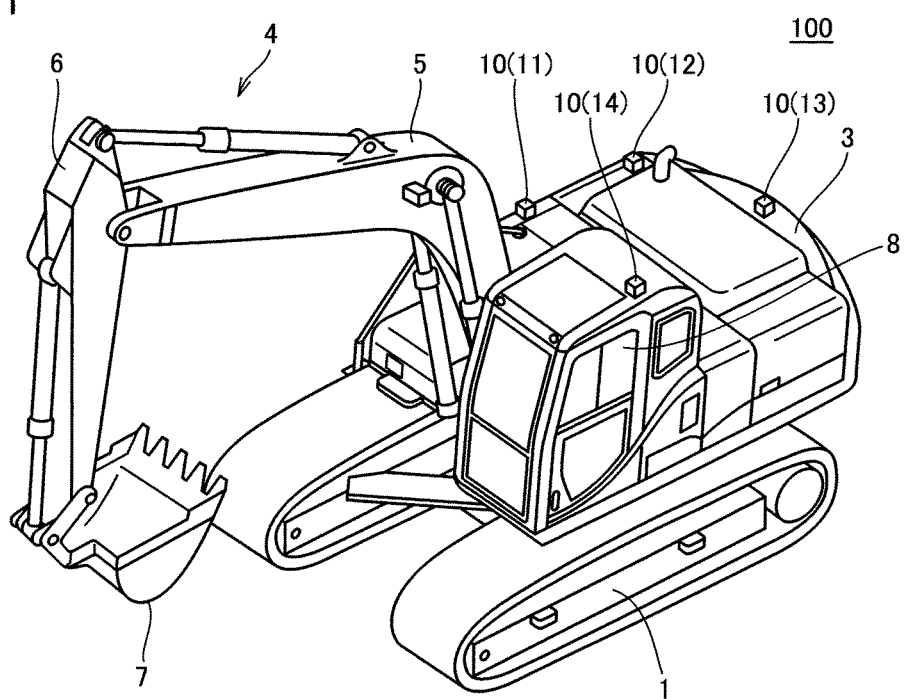
FIG. 1 is a diagram illustrating the external appearance of a hydraulic excavator according to an embodiment.

In the following, embodiments will be described with reference to the accompanying drawings. In the following description, the same components are designated by the same reference characters. Names and functions thereof are also the same. Accordingly, the detailed description thereof will not be repeated.

It has been originally intended to combine the configurations described in the embodiments as appropriate. Also, some of the components may not be used.

[Entire Configuration of Work Vehicle]

First, the configuration of a hydraulic excavator 100 will be hereinafter described as an example of a work vehicle. FIG. 1 is a diagram illustrating the external appearance of hydraulic excavator 100 according to an embodiment.

As shown in FIG. 1, hydraulic excavator 100 mainly includes a traveling unit 1, a revolving unit 3, and a work implement 4. The main body of the hydraulic excavator is formed of traveling unit 1 and revolving unit 3. Traveling unit 1 includes a pair of crawler belts on the right and left sides. Revolving unit 3 is mounted so as to be rotatable in traveling unit 1 via a revolving mechanism in an upper portion of traveling unit 1. Revolving unit 3 includes an operator's cab 8.

Work implement 4 is pivotally supported on revolving unit 3 so as to be operable in the up-down direction, and configured to perform such work as excavation of soil. Work implement 4 is actuated with hydraulic oil supplied from a hydraulic pump (see FIG. 2). Work implement 4 includes a boom 5, an arm 6, and a bucket 7. Boom 5 has a base end that is coupled to revolving unit 3. Arm 6 is coupled to a leading end of boom 5. Bucket 7 is coupled to a leading end of arm 6. Each of boom 5, arm 6 and bucket 7 is driven by a hydraulic cylinder, so that work implement 4 can be driven.

Hydraulic excavator 100 is equipped with a camera 10. Camera 10 serves as an imaging device for imaging the surrounding area of hydraulic excavator 100 and obtaining an image of the surrounding area of hydraulic excavator 100. Camera 10 is configured to be capable of obtaining current geographical features around hydraulic excavator 100 and also capable of recognizing the existence of an obstacle around hydraulic excavator 100.

Camera 10 includes a right front camera 11, a right rear camera 12, a rear camera 13, and a left camera 14. Right front camera 11 and right rear camera 12 are disposed at the right side edge on the upper surface of revolving unit 3. Right front camera 11 is disposed forward of right rear camera 12. Right front camera 11 is disposed in the vicinity of the center portion of revolving unit 3 in the front-rear direction. Right rear camera 12 is disposed in the vicinity of the rear end of revolving unit 3 in the front-rear direction.

In the present embodiment, the positional relation of the components in hydraulic excavator 100 will be described with respect to work implement 4.

Boom 5 of work implement 4 pivots about a boom pin provided at the base end of boom 5 with respect to revolving unit 3. A specific portion of boom 5 that pivots with respect to revolving unit 3, for example, the leading end of boom 5, moves along an arcuate track. A plane including this arcuate track is specified. In a plan view of hydraulic excavator 100, this plane is shown as a straight line. The direction in which this straight line extends corresponds to the front-rear direction of the main body of the hydraulic excavator or the front-rear direction of revolving unit 3, and will be hereinafter also simply referred to as a front-rear direction. The right-left direction of the main body of the hydraulic excavator (the vehicle width direction) or the right-left direction of revolving unit 3 corresponds to the direction orthogonal to the front-rear direction in a plan view, and will be hereinafter also simply referred to as a right-left direction.

With respect to the front-rear direction, work implement 4 protrudes from the main body of the hydraulic excavator in the front direction that is opposite to the rear direction. In a facing forward view, the right side and the left side in the right-left direction correspond to the right direction and the left direction, respectively.

The front-rear direction corresponds to the front-rear direction of an operator sitting on an operator's seat inside an operator's cab 8. The direction in which the operator sitting on the operator's seat faces corresponds to the front direction. The direction rearward of the operator sitting on the operator's seat corresponds to the rear direction. The right-left direction corresponds to the right-left direction of the operator sitting on the operator's seat. In the state where the operator sitting on the operator's seat faces forward, the right side and the left side correspond to the right direction and the left direction, respectively.

Rear camera 13 is disposed at the rear end of revolving unit 3 in the front-rear direction, and located in the center portion of revolving unit 3 in the right-left direction. At the rear end of revolving unit 3, a counter weight is provided for keeping the balance of the vehicle body during excavation and the like. Rear camera 13 is disposed on the upper surface of the counter weight. Left camera 14 is disposed on the upper surface of operator's cab 8. Operator's cab 8 is disposed on the front left side of revolving unit 3.

[System Configuration]

Figure 2:
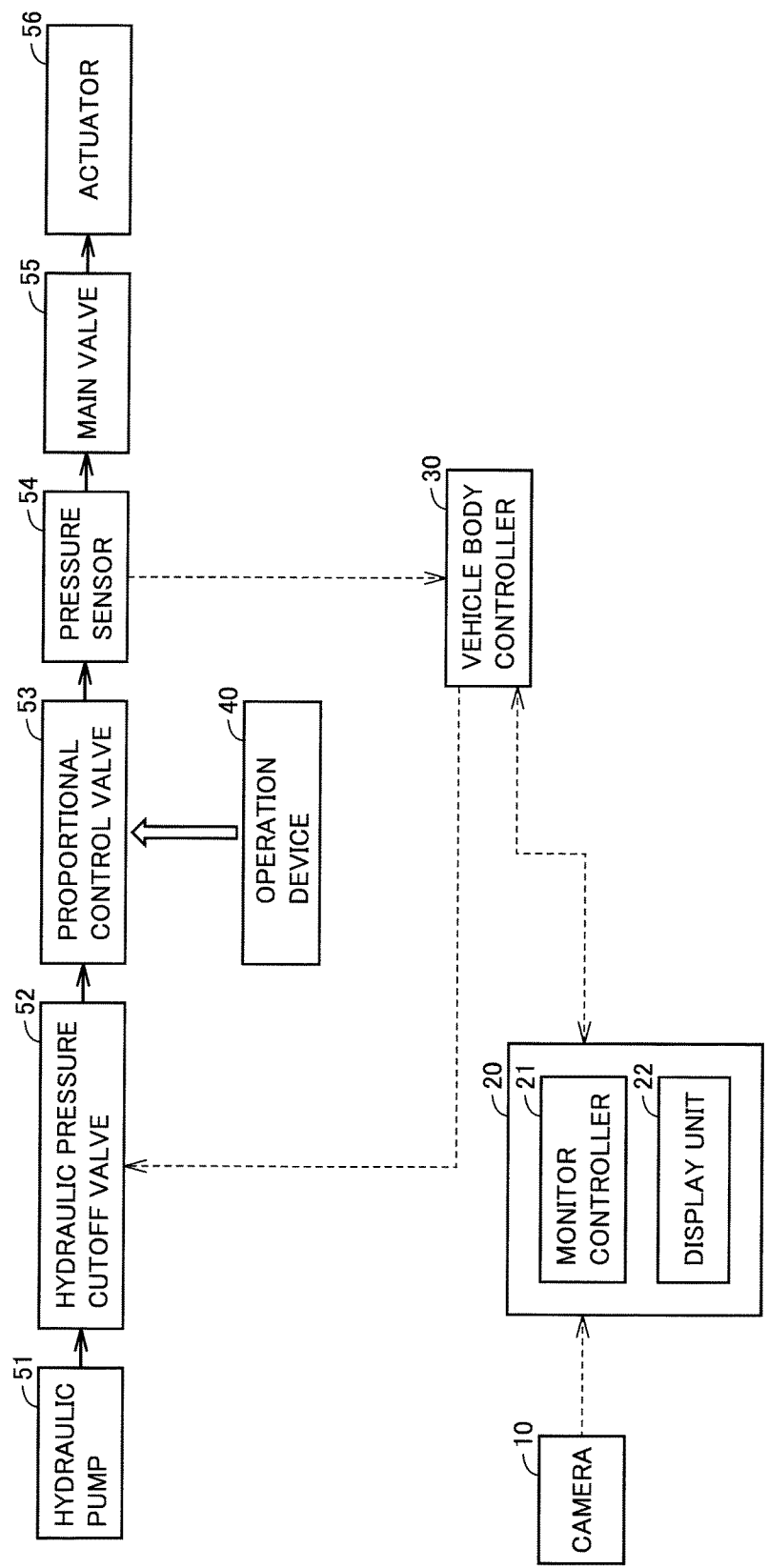
FIG. 2 is a block diagram showing the system configuration of the hydraulic excavator.

FIG. 2 is a block diagram showing the system configuration of hydraulic excavator 100. As shown in FIG. 2, hydraulic excavator 100 includes: a monitor device 20, a vehicle body controller 30, an operation device 40, and a hydraulic circuit extending from a hydraulic pump 51 to an actuator 56. The solid line arrow in FIG. 2 shows this hydraulic circuit.

Monitor device 20 is configured to include a monitor controller 21 and a display unit 22. Display unit 22 displays a surrounding image of hydraulic excavator 100 generated using camera 10. The surrounding image of hydraulic excavator 100 includes a mono image formed of an image taken by one of right front camera 11, right rear camera 12, rear camera 13 and left camera 14. Furthermore, the surrounding image of hydraulic excavator 100 includes a bird's-eye-view image formed by synthesizing a plurality of images taken by right front camera 11, right rear camera 12, rear camera 13, and left camera 14.

Display unit 22 also displays the vehicle body information about hydraulic excavator 100. The vehicle body information about hydraulic excavator 100 includes, for example, the operation mode of hydraulic excavator 100, the amount of remaining fuel indicated by a fuel indicator, the temperature of coolant or the temperature of hydraulic oil that is indicated by a thermometer, the operation status of an air-conditioner, and the like. Display unit 22 is capable of displaying at least one of the surrounding image and the vehicle body information.

Monitor controller 21 controls the display content on display unit 22. Monitor controller 21 instructs display unit 22 to display the surrounding image, to display the vehicle body information, or to simultaneously display the surrounding image and the vehicle body information. Display unit 22 may be a touch panel. In this case, the operator touches a part of display unit 22 to thereby operate monitor controller 21.

Vehicle body controller 30 serves as a controller configured to control the entire actuation of hydraulic excavator 100. Vehicle body controller 30 is formed of a central processing unit (CPU), a non-volatile memory, a timer, and the like. Monitor device 20 is configured to be capable of communicating with vehicle body controller 30. The dashed line arrow in FIG. 2 shows an electric circuit. FIG. 2 shows only a part of the electric circuit constituting hydraulic excavator 100 in the embodiment.

The "controller" in the embodiment means a concept including both monitor controller 21 and vehicle body controller 30. The bird's-eye-view image formed by synthesizing a plurality of mono images may be generated by monitor controller 21 or may be generated by vehicle body controller 30. The imaging device (camera) configured to image a mono image and monitor controller 21 and/or vehicle body controller 30 in the embodiment have a function as a generating unit for generating a bird's-eye-view image.

Operation device 40 is operated for actuating hydraulic excavator 100. Operation device 40 is configured to include, for example, a control lever for operating work implement 4, a pedal for operating traveling unit 1, and the like.

Upon reception of motive power from the engine, hydraulic pump 51 is driven to discharge pressurized oil. Hydraulic pump 51 includes a hydraulic oil pressure source and a pilot oil pressure source. The pressurized oil discharged from hydraulic pump 51 includes hydraulic oil supplied to actuator 56 and pilot oil for moving a spool of a main valve 55. Hydraulic pump 51 generates hydraulic pressure used for driving actuator 56. Actuator 56 is actuated with the hydraulic oil supplied from hydraulic pump 51.

The hydraulic circuit shown in FIG. 2 includes a hydraulic pressure cutoff valve 52, a proportional control valve 53, a pressure sensor 54, and a main valve 55. The pilot oil discharged from hydraulic pump 51 is supplied sequentially through hydraulic pressure cutoff valve 52, proportional control valve 53 and pressure sensor 54 to main valve 55.

Hydraulic pressure cutoff valve 52, proportional control valve 53 and pressure sensor 54 are connected in this order from the upstream to the downstream of the flow of the pilot oil moving from hydraulic pump 51 to main valve 55.

Upon reception of an instruction signal from vehicle body controller 30, hydraulic pressure cutoff valve 52 is switched between the opened state and the closed state. When hydraulic pressure cutoff valve 52 is switched to the opened state, the pilot oil is supplied from hydraulic pump 51 to proportional control valve 53, to thereby enable the operation of operation device 40, so that hydraulic oil is supplied from hydraulic pump 51 to actuator 56. When hydraulic pressure cutoff valve 52 is switched to the closed state, the hydraulic circuit is interrupted to thereby stop supply of hydraulic oil from hydraulic pump 51 to actuator 56. In the closed state, hydraulic pressure cutoff valve 52 cuts off supply of the pilot oil from hydraulic pump 51 to proportional control valve 53.

Proportional control valve 53 is mechanically actuated by operating operation device 40. This mechanical movement of operation device 40 is converted into hydraulic pressure fluctuations in pilot oil through the actuation of proportional control valve 53. The opening degree of proportional control valve 53 is changed according to the operation of operation device 40. The outlined arrow shown in FIG. 2 shows mechanical coupling between operation device 40 and proportional control valve 53. Proportional control valve 53 is actuated according to the operation of operation device 40. However, the operation of operation device 40 is not hydraulically or electrically transmitted to proportional control valve 53, and the hydraulic circuit or the electric circuit as described above is not interposed between operation device 40 and proportional control valve 53.

Pressure sensor 54 is disposed downstream from proportional control valve 53 and configured to detect the pressure of the pilot oil having passed through proportional control valve 53. Pressure sensor 54 detects the pressure fluctuations in the pilot oil caused by the operation of operation device 40. Pressure sensor 54 may be a pressure switch configured to detect generation of pressure in the pilot oil to thereby sense that operation device 40 is operated.

Main valve 55 includes a spool. By moving the spool according to the pressure of the pilot oil, main valve 55 adjusts the amount of hydraulic oil to be supplied from hydraulic pump 51 to actuator 56.

For example, actuator 56 may be a hydraulic cylinder for driving boom 5, arm 6 or bucket 7, or may be a slewing motor for causing revolving unit 3 to rotate.

Figure 3:
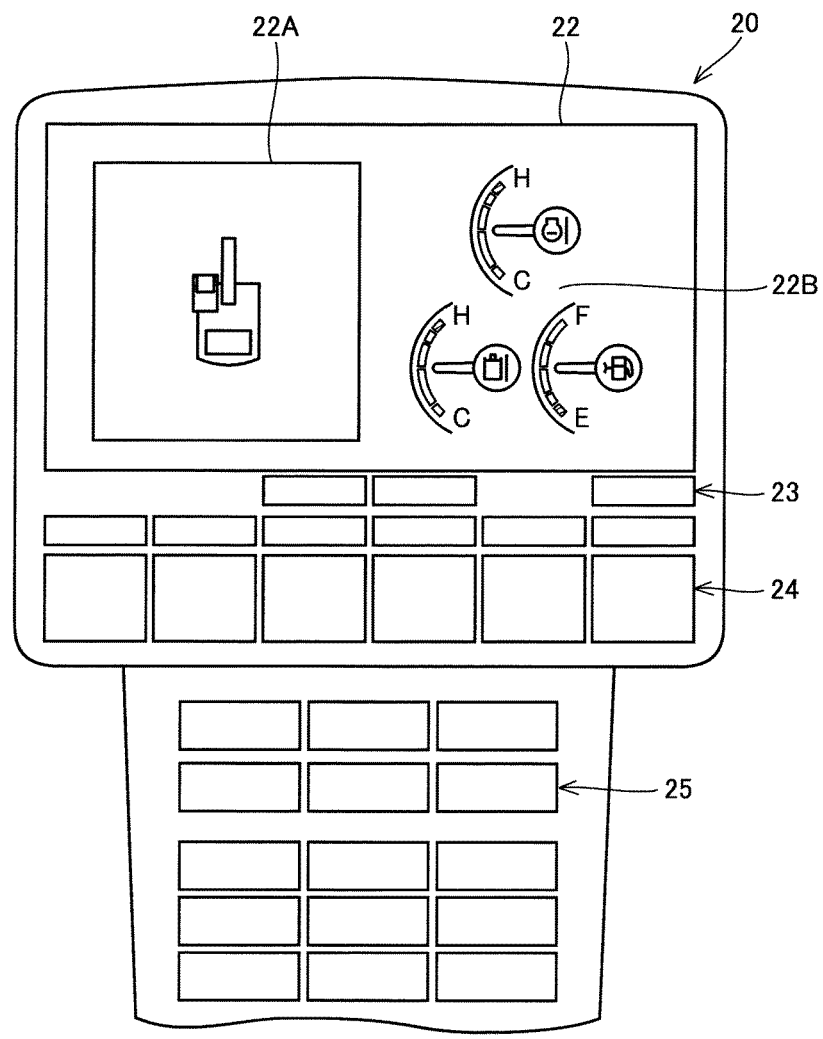
FIG. 3 is a schematic diagram showing the configuration of a monitor device.

FIG. 3 is a schematic diagram showing the configuration of monitor device 20. Monitor device 20 includes display unit 22 as described above. Display unit 22 is implemented using a liquid crystal display or the like. A region 22A included as a partial region in display unit 22 shown in FIG. 3 shows a bird's-eye-view image generated by synthesizing a plurality of mono images taken by cameras. A region 22B included as a partial region in display unit 22 shown in FIG. 3 shows vehicle body information. Specifically, region 22B shows: a fuel indicator indicating the amount of remaining fuel; and thermometers indicating the temperature of coolant and the temperature of hydraulic oil. Display unit 22 shown in FIG. 3 shows both the surrounding image and the vehicle body information.

Display unit 22 is disposed in the upper portion of monitor device 20 as shown in FIG. 3. Guidance icons 23 are provided below display unit 22. Function switches 24 are provided below guidance icons 23. Guidance icons 23 each correspond to a corresponding one of function switches 24. For example, when the system is configured such that the display content on display unit 22 is switched by operating function switches 24, guidance icons 23 includes an icon meaning that the display content on display unit 22 is switched.

Basic operation switches 25 are provided below function switches 24. Basic operation switches 25 include an auto-deceleration switch, an operation mode selection switch, a traveling speed selection switch, a buzzer cancellation switch, a wiper switch, a window washer switch, an air-conditioner switch, and the like.

The auto-deceleration switch serves to perform deceleration control for decreasing the engine rotation speed after a prescribed time period has elapsed since operation device 40 was returned to a neutral position. The "neutral position" means a position at which operation device 40 is not operated (a neutral position). The operation mode selection switch serves to select the operation mode of hydraulic excavator 100 from among a plurality of modes. The traveling speed selection switch serves to select the traveling speed stage of hydraulic excavator 100 from among a plurality of speed stages. The buzzer cancellation switch serves to cancel a buzzer sound that is produced when a prescribed warning state occurs.

The wiper switch serves to actuate a wiper (not shown) provided in a windshield of operator's cab 8 (FIG. 1) of hydraulic excavator 100. The window washer switch serves to actuate a washer (not shown) for injecting cleaning water toward the windshield. The air-conditioner switch serves to operate various functions of an air-conditioner inside operator's cab 8.

The operations of function switch 24 and basic operation switch 25 by the operator are input into monitor controller 21.

[Actuation]

Figure 4:
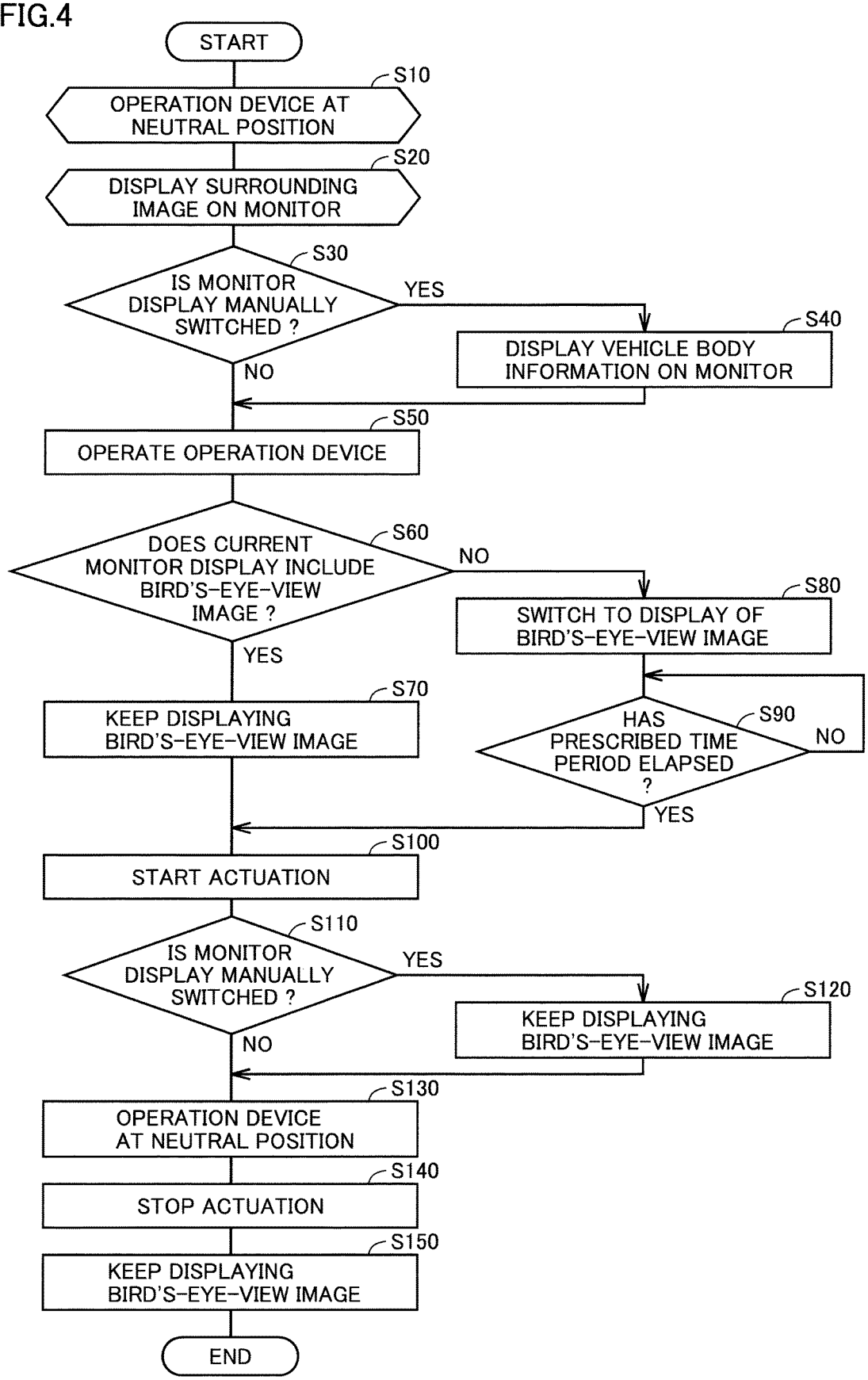
FIG. 4 is a flowchart illustrating the flow of the actuation of the hydraulic excavator based on a display content on a display unit.

FIG. 4 is a flowchart illustrating the flow of the actuation of hydraulic excavator 100 based on a display content on display unit 22. As shown in FIG. 4, when hydraulic excavator 100 is not actuated, operation device 40 operated for actuating hydraulic excavator 100 is at a neutral position at which this operation device 40 is not operated (step S10). At this time, monitor controller 21 causes display unit 22 to display the surrounding image of hydraulic excavator 100 (step S20).

Figure 5:
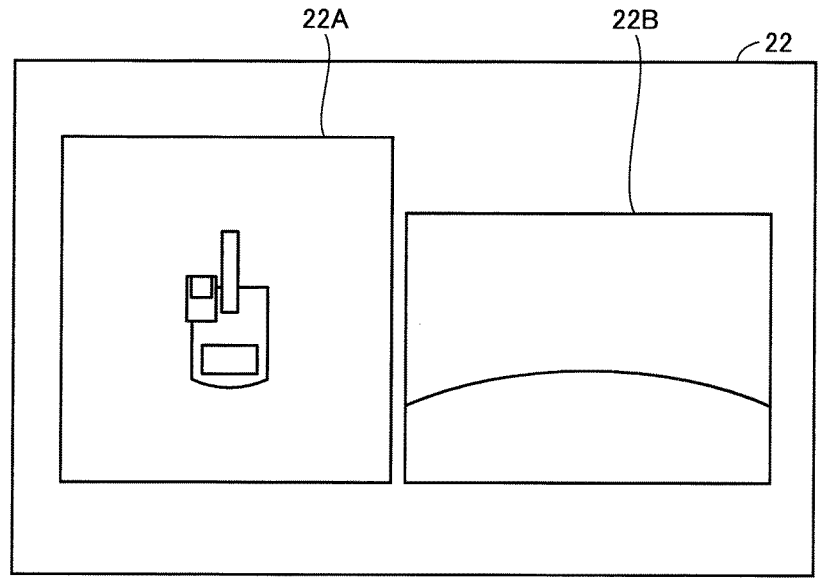
FIG. 5 is a schematic diagram showing an example of a surrounding image displayed on the display unit.
Figure 6:
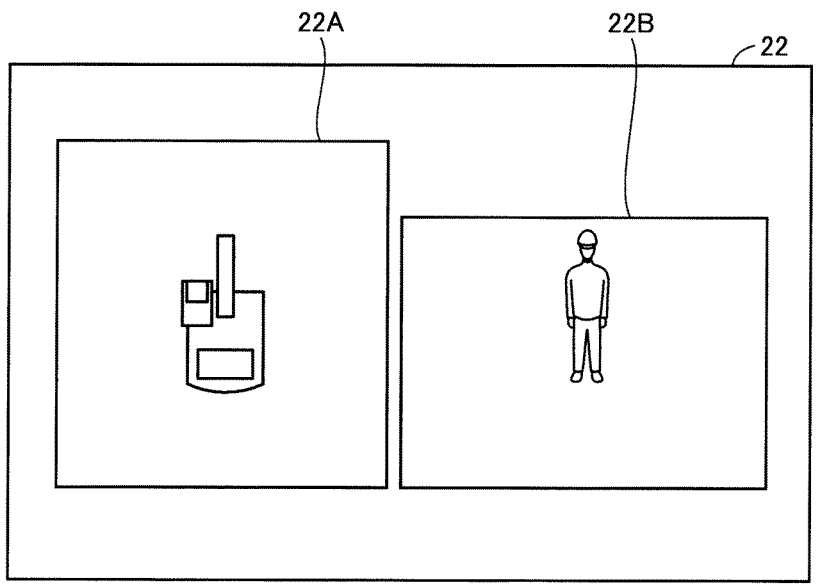
FIG. 6 is a schematic diagram showing an example of the surrounding image displayed on the display unit.

FIGS. 5 and 6 each are a schematic diagram showing an example of the surrounding image displayed on display unit 22. As described above, the surrounding image of hydraulic excavator 100 includes: a mono image generated from an image taken by one of right front camera 11, right rear camera 12, rear camera 13 and left camera 14; and a bird's-eye-view image generated by synthesizing the mono images. A bird's-eye-view image is displayed in region 22A as a partial region inside display unit 22 shown in FIG. 5. A mono image generated from an image taken by rear camera 13 is displayed in region 22B as a partial region inside display unit 22 shown in FIG. 5. Both the bird's-eye-view image and the mono image are displayed in display unit 22 shown in FIG. 5.

A bird's-eye-view image is displayed in region 22A shown in FIG. 6 in the same manner as in FIG. 5. A mono image generated from the image taken by right rear camera 12 is displayed in region 23B shown in FIG. 6. Both the bird's-eye-view image and the mono image are displayed on display unit 22 shown in FIG. 6.

Referring back to FIG. 4, hydraulic excavator 100 in the embodiment is configured such that the display content on display unit 22 can be manually switched by the operator operating function switches 24 shown in FIG. 3. While operation device 40 is not operated, the display content on display unit 22 can be switched between the display including a bird's-eye-view image and the display not including a bird's-eye-view image (for example, the display including only the vehicle body information). In step S30, it is determined whether the display content on display unit 22 is manually switched or not.

When the display content on display unit 22 is switched to the content including the vehicle body information (YES in step S30), the process proceeds to step S40. Then, monitor controller 21 causes display unit 22 to display the vehicle body information.

Figure 7:
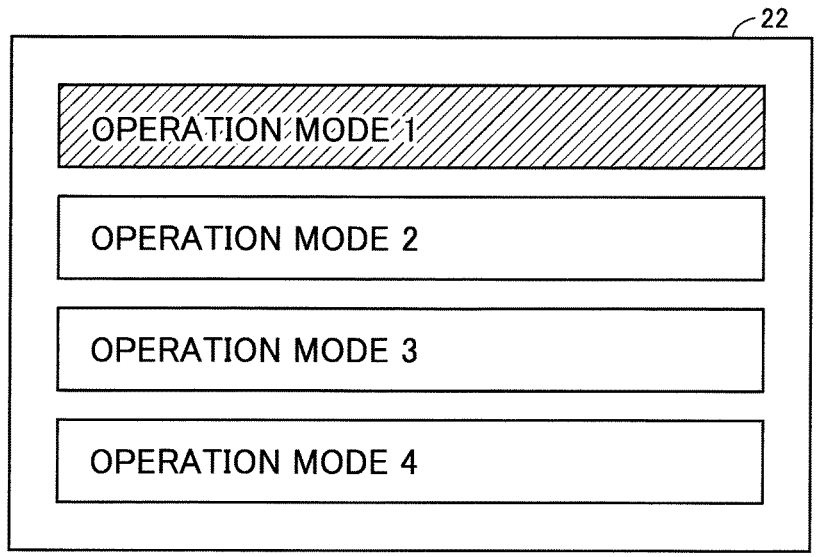
FIG. 7 is a schematic diagram showing an example of vehicle body information displayed on the display unit.
Figure 8:
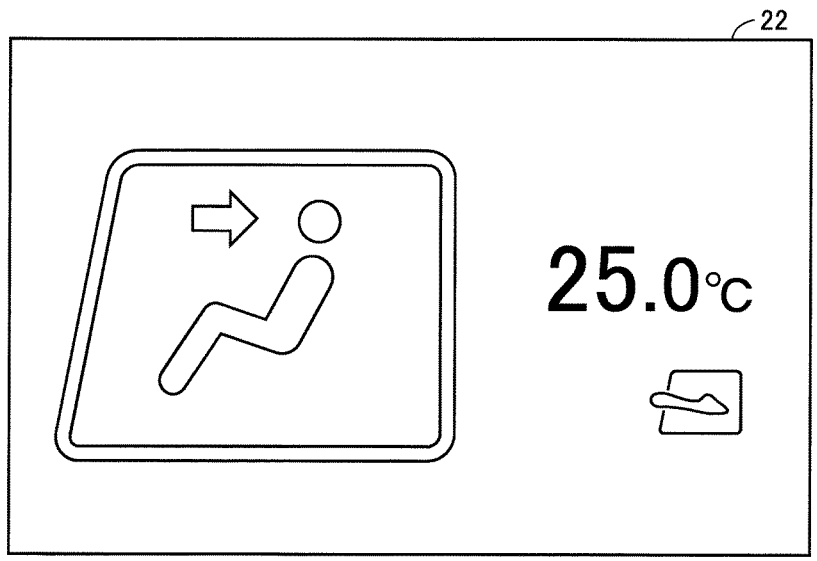
FIG. 8 is a schematic diagram showing an example of the vehicle body information displayed on the display unit.

FIGS. 7 and 8 each are a schematic diagram showing an example of the vehicle body information displayed on display unit 22. FIG. 7 shows a screen showing the operation mode currently selected from among a plurality of operation modes of hydraulic excavator 100 as an example of the vehicle body information. FIG. 8 shows a screen showing the operation status of the air-conditioner.

Referring back to FIG. 4, the operator starts to operate operation device 40 in step S50. Pressure sensor 54 shown in FIG. 2 detects the pressure fluctuations in pilot oil, and the signal showing such pressure fluctuations is input into vehicle body controller 30, thereby sensing that the operation device 40 is operated by the operator. When the operation of operation device 40 is sensed, it is determined in step S60 whether the current display content on display unit 22 includes a bird's-eye-view image or not.

When it is determined in step S60 that the current display content on display unit 22 includes a bird's-eye-view image (YES in step S60), monitor controller 21 keeps displaying the bird's-eye-view image on display unit 22 (step S70). Then, in step S100, vehicle body controller 30 starts to actuate hydraulic excavator 100 according to the operation of operation device 40.

Keeping display of the surrounding image on display unit 22 in step S70 means that the display of the bird's-eye-view image displayed before starting to operate operation device 40 is maintained as it is. When the bird's-eye-view image and another image are displayed on display unit 22, another image may be switched to a mono image while the bird's-eye-view image is maintained. Another image in this case may be vehicle body information or may be a mono image taken by a different camera 10. For example, before starting to operate operation device 40, in the states where a bird's-eye-view image is displayed on region 22A of display unit 22 and where a mono image taken by rear camera 13 is displayed on region 22B, and when revolving unit 3 is rotated rightward by the operation of operation device 40, the display on region 22B may be switched to a mono image taken by right rear camera 12.

When it is determined in step S60 that the current display content on display unit 22 does not include a bird's-eye-view image (NO in step S60), the process proceeds to step S80. Then, monitor controller 21 switches the display content on display unit 22 so as to display a bird's-eye-view image on display unit 22. The surrounding image displayed on display unit 22 in this step 80 may include an image corresponding to the operation of operation device 40. For example, when hydraulic excavator 100 is caused to travel forward, a bird's-eye-view image may be displayed on region 22A of display unit 22 while a mono image generated from an image taken by rear camera 13 may be displayed on region 22B. Also, for example, when revolving unit 3 is rotated rightward, a bird's-eye-view image may be displayed on region 22A while a mono image generated from an image taken by right rear camera 12 may be displayed on region 22B.

Then, it is determined in step S90 whether a prescribed time period has elapsed or not. When a prescribed time period has not elapsed (NO in step S90), the determination in step S90 is repeated. After a prescribed time period has elapsed since a bird's-eye-view image was displayed on display unit 22, the process proceeds to step S100, in which vehicle body controller 30 starts to actuate hydraulic excavator 100 according to the operation of operation device 40.

Then, it is determined in step S110 whether to manually switch the display content on display unit 22 or not. The determination in step S110 is the same as the determination in step S30 described above. However, operation device 40 is not operated in step S30, whereas operation device 40 is operated in step S110. In this case, even when the display content on display unit 22 is tried to be manually switched (YES in step S110), the display is not switched but the bird's-eye-view image is kept displayed (step S120). Monitor controller 21 does not allow manual switching of the display content on display unit 22 while operation device 40 is operated.

The process in step S120 is performed, for example, by disabling the operation of function switch 24 for switching the display content on display unit 22 even when this function switch 24 is operated while operation device 40 is operated. When display unit 22 is a touch panel and shows an icon for screen switching, this icon for screen switching may not be displayed on display unit 22 while operation device 40 is operated.

Then, operation device 40 is brought into a neutral position (step S130). Pressure sensor 54 shown in FIG. 2 detects pressure fluctuations in pilot oil, and the signal showing such pressure fluctuations is input into vehicle body controller 30, thereby sensing that operation device 40 is returned to a neutral position. When it is sensed that operation device 40 is brought into a neutral position, the actuation of hydraulic excavator 100 is stopped (step S140). When operation device 40 is at a neutral position, monitor controller 21 keeps displaying the display content on display unit 22, which includes a bird's-eye-view image (step S150). Then, the process ends.

[Functions and Effects]

The following is a summary of the characteristic configuration and the functions and effects about hydraulic excavator 100 as described above.

Hydraulic excavator 100 includes display unit 22 as shown in FIG. 2. Display unit 22 can display a bird's-eye-view image formed by synthesizing mono images generated from images around hydraulic excavator 100 that are taken by camera 10. Hydraulic excavator 100 further includes monitor controller 21 configured to control the display content on display unit 22. As shown in FIG. 4, in the state where display unit 22 displays a bird's-eye-view image, when the operation of operation device 40 is sensed, the bird's-eye-view image is kept displayed. In the state where display unit 22 does not display a bird's-eye-view image, when the operation of operation device 40 is sensed, the display content on display unit 22 is switched so as to display a bird's-eye-view image on display unit 22.

In hydraulic excavator 100, both the vehicle body information and the surrounding image taken by a camera for monitoring the surrounding area need to be displayed on display unit 22. When the monitor displaying the vehicle body information and the monitor displaying the surrounding image are separately installed, the space for two monitors needs to be provided. For saving space, one of the vehicle body information and the surrounding image is selectively displayed on one display unit 22.

When hydraulic excavator 100 is actuated, a bird's-eye-view image needs to be displayed for monitoring the surrounding area. When the operation of operation device 40 is started for actuating hydraulic excavator 100, the bird's-eye-view image is kept displayed if the bird's-eye-view image is displayed on display unit 22, but the display content is switched so as to display a bird's-eye-view image if no bird's-eye-view image is displayed on display unit 22. The bird's-eye-view image is displayed on display unit 22 when hydraulic excavator 100 is actuated. Accordingly, by checking the bird's-eye-view image displayed on display unit 22, the operator can check the conditions around hydraulic excavator 100.

Also as shown in FIG. 4, when it is sensed that operation device 40 is brought into a neutral position, the bird's-eye-view image is kept displayed. In this way, the display content on display unit 22 is not frequently switched at the time when operation device 40 is operated and the time when operation device 40 is not operated. Furthermore, only the operator's manual switching allows switching to a screen including only the vehicle body information. Accordingly, the bird's-eye-view image does not unintentionally disappear from display unit 22. Therefore, the operator can continuously check the conditions around hydraulic excavator 100.

Also as shown in FIG. 4, the display content on display unit 22 can be manually switched while operation device 40 is not operated. Manual switching of the display content on display unit 22 is not allowed while operation device 40 is operated. Switching of the display content on display unit 22 is restricted, thereby preventing the operator from manually switching the display on display unit 22 to a screen not including a surrounding image. Thus, the operator can continuously check the conditions around hydraulic excavator 100.

Also as shown in FIG. 4, when the current display content on display unit 22 does not include a bird's-eye-view image, the actuation of hydraulic excavator 100 is started after a prescribed time period has elapsed since a bird's-eye-view image was displayed on display unit 22. This allows the operator to secure the time to check the conditions around hydraulic excavator 100 after a bird's-eye-view image is displayed on display unit 22. Thus, the actuation of hydraulic excavator 100 can be started after the operator reliability checks the conditions around hydraulic excavator 100.

The above-described operation device 40 is mechanically coupled to proportional control valve 53 and configured to be capable of detecting the operation of operation device 40 by detecting the pressure fluctuations in pilot oil having passed through proportional control valve 53. Without being limited to this configuration, operation device 40 may be an electronic device. For example, operation device 40 includes a control lever and an operation detector for detecting the operation amount of the control lever. Also, operation device 40 may be configured such that the operation detector outputs, to vehicle body controller 30, an electrical signal in accordance with the operation direction and the operation amount of the control lever when the control lever is operated.

[Control System]

Figure 9:
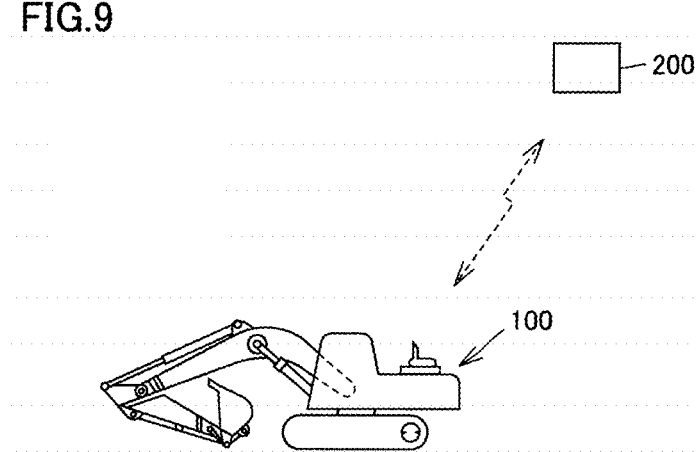
FIG. 9 is a diagram showing the schematic configuration of a control system.

FIG. 9 is a diagram showing the schematic configuration of a control system. The above embodiments have been described with regard to an example in which hydraulic excavator 100 includes operation device 40, display unit 22, monitor controller 21, and vehicle body controller 30, as shown in FIG. 2. Hydraulic excavator 100 does not necessarily have to be operated by an operator inside operator's cab 8 but may be operated by remote control.

As shown in FIG. 9, the control system includes a remote controller 200. Remote controller 200 is placed outside hydraulic excavator 100 and capable of transmitting and receiving signals to and from the controller mounted in hydraulic excavator 100.

Remote controller 200 is connected to an operation device operated for actuating hydraulic excavator 100 and a display unit on which a bird's-eye-view image around hydraulic excavator 100 can be displayed. Remote controller 200 receives an input of the electrical signal in accordance with the operation of the operation device by the operator. Remote controller 200 controls the display content on the display unit.

Mono images are generated from images imaged by a plurality of imaging devices provided in hydraulic excavator 100. By synthesizing these mono images, a bird's-eye-view image of hydraulic excavator 100 is generated. The controller mounted in hydraulic excavator 100 may generate a bird's-eye-view image and transmit the generated bird's-eye-view image to remote controller 200. Alternatively, remote controller 200 having received the mono images or the images taken by the imaging devices may generate a bird's-eye-view image.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

REFERENCE SIGNS LIST 1 traveling unit, 3 revolving unit, 4 work implement, 5 boom, 6 arm, 7 bucket, 8 operator's cab, 10 camera, 11 right front camera, 12 right rear camera, 13 rear camera, 14 left camera, 20 monitor device, 21 controller, 22 display unit, 22A, 22B, 22C, 23B region, 30 vehicle body controller, 40 operation device, 51 hydraulic pump, 52 hydraulic pressure cutoff valve, 53 proportional control valve, 54 pressure sensor, 55 main valve, 56 actuator, 100 hydraulic excavator.

The invention claimed is:
1. A work vehicle comprising:
a revolving unit;
a work implement supported on the revolving unit;
an operation device configured to be operated for actuating the work implement with respect to the revolving unit;
a display unit on which a bird's-eye-view image around the work vehicle can be displayed; and
a controller configured to control a display content on the display unit,
the controller being configured to
keep displaying the bird's-eye-view image when an operation of the operation device for actuating the work implement is sensed in a state where the display unit displays the bird's-eye-view image, and
cause the display unit to display the bird's-eye-view image when the operation of the operation device for actuating the work implement is sensed in a state where the display unit does not display the bird's-eye-view image, wherein the display content on the display unit can be manually switched between the bird's-eye-view image and vehicle body information about the work vehicle while the operation device for actuating the work implement is not operated, and the controller is configured to cause the display unit not to display an icon for manual switching of the display content from the bird's-eye-view image while the operation device for actuating the work implement is operated.

2. The work vehicle according to claim 1, wherein when it is sensed that the operation device for actuating the work implement is at a neutral position, the controller keeps displaying the bird's-eye-view image.

3. The work vehicle according to claim 1, wherein the controller is configured to control an actuation of the work vehicle, and when the display unit does not display the bird's-eye-view image, the controller allows the actuation of the work vehicle after a lapse of a prescribed time period since the bird's-eye-view image is displayed on the display unit.

4. A control system for a work vehicle, the work vehicle including a revolving unit and a work implement supported on the revolving unit, the control system comprising:

an operation device configured to be operated for actuating the work implement with respect to the revolving unit;

a controller configured to generate a bird's-eye-view image around the work vehicle; and a display unit on which the bird's-eye-view image can be displayed, wherein the bird's-eye-view image is kept displayed when an operation of the operation device for actuating the work implement is sensed in a state where the display unit displays the bird's-eye-view image, the display unit is caused to display the bird's-eye-view image when the operation of the operation device for actuating the work implement is sensed in a state where the display unit does not display the bird's-eye-view image, and the display unit is prevented from displaying an icon for switching between the display of the bird's-eye-view image and a display of vehicle body information about the work vehicle while the operation device for actuating the work implement is operated.

* * * * *